United States Patent
Keller

(10) Patent No.: US 10,543,743 B1
(45) Date of Patent: Jan. 28, 2020

(54) DRIVE AND COOLING SYSTEM FOR UTILITY VEHICLE

(71) Applicant: Hydro-Gear Limited Partnership, Sullivan, IL (US)

(72) Inventor: Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 16/551,372

(22) Filed: Aug. 26, 2019

Related U.S. Application Data

(63) Continuation of application No. 15/182,869, filed on Jun. 15, 2016, now Pat. No. 10,391,854.

(60) Provisional application No. 62/175,647, filed on Jun. 15, 2015.

(51) Int. Cl.
| | |
|---|---|
| *B60K 11/04* | (2006.01) |
| *B60K 11/02* | (2006.01) |
| *F15B 11/17* | (2006.01) |
| *B62D 11/04* | (2006.01) |
| *B62D 11/00* | (2006.01) |
| *A01D 34/82* | (2006.01) |
| *A01D 34/66* | (2006.01) |
| *B60K 8/00* | (2006.01) |

(52) U.S. Cl.
CPC ............. *B60K 11/02* (2013.01); *A01D 34/66* (2013.01); *A01D 34/82* (2013.01); *B60K 8/00* (2013.01); *B62D 11/005* (2013.01); *B62D 11/04* (2013.01); *F15B 11/17* (2013.01); *F15B 2211/20576* (2013.01); *F15B 2211/71* (2013.01)

(58) Field of Classification Search
CPC .... F01P 7/00; F01P 7/14; B60K 11/00; B60K 11/02
See application file for complete search history.

(56) References Cited

U.S. PATENT DOCUMENTS

| | | | |
|---|---|---|---|
| 4,278,928 | A | 7/1981 | Griffiths et al. |
| 4,427,150 | A | 1/1984 | van Basshuysen et al. |
| 4,815,550 | A | 3/1989 | Mather et al. |
| 4,906,166 | A | 3/1990 | Seidel |
| 4,949,805 | A | 8/1990 | Mather et al. |
| 4,971,525 | A | 11/1990 | Nakayoshi et al. |
| 5,127,485 | A | 7/1992 | Wakuta et al. |
| 5,372,213 | A | 12/1994 | Hasebe et al. |
| 5,474,428 | A | 12/1995 | Kimura et al. |
| 5,713,427 | A | 2/1998 | Lutz et al. |

(Continued)

FOREIGN PATENT DOCUMENTS

| | | |
|---|---|---|
| WO | WO2012092344 | 5/2012 |
| WO | WO2013026062 | 2/2013 |
| WO | WO2015186414 | 12/2015 |

*Primary Examiner* — John D Walters
*Assistant Examiner* — James J Triggs
(74) *Attorney, Agent, or Firm* — Neal, Gerber & Eisenberg LLP

(57) ABSTRACT

A utility vehicle having a combined generator and coolant circulating pump assembly and at least one combined hydraulic pump and circulating pump is disclosed herein. An auxiliary pump may be disposed on a second hydraulic pump on the vehicle. A plurality of coolant reservoirs may be provided on the vehicle. The vehicle may also include a receiver for receiving signals from a remote operator transmitter, permitting remote operation of the vehicle, and an operator platform for permitting direct user control.

18 Claims, 9 Drawing Sheets

(56) References Cited

U.S. PATENT DOCUMENTS

| | | |
|---|---|---|
| 5,775,583 A | 7/1998 | Braatz et al. |
| 5,952,746 A | 9/1999 | Mittmann et al. |
| 6,026,921 A | 2/2000 | Aoyama et al. |
| 6,332,393 B1 | 12/2001 | Trimble |
| 6,394,210 B2 | 5/2002 | Matsuda et al. |
| 6,450,275 B1 | 9/2002 | Gabriel et al. |
| 6,527,074 B1 | 3/2003 | Morishita |
| 6,568,494 B2 | 5/2003 | Takahashi |
| 6,591,806 B2 | 7/2003 | Asano et al. |
| 6,651,761 B1 | 11/2003 | Hrovat et al. |
| 6,777,837 B2 | 8/2004 | Tsuzuki et al. |
| 6,811,509 B1 | 11/2004 | Langenfeld et al. |
| 6,973,383 B2 | 12/2005 | Mitsutani et al. |
| 7,017,693 B2 | 3/2006 | Omote et al. |
| 7,083,014 B2 | 8/2006 | Forster |
| 7,131,825 B2 | 11/2006 | Wos |
| 7,156,195 B2 | 1/2007 | Yamagishi et al. |
| 7,160,086 B2 | 1/2007 | Maceyka et al. |
| 7,282,875 B2 | 10/2007 | Lindsey |
| 7,311,184 B2 | 12/2007 | Patridge |
| 7,421,928 B2 | 9/2008 | Klaus et al. |
| 7,485,979 B1 | 2/2009 | Staalesen |
| 7,614,227 B2 | 11/2009 | Carlson et al. |
| 7,669,414 B2 | 3/2010 | Loeffler |
| 7,729,118 B2 | 6/2010 | Lai et al. |
| 7,870,915 B2 | 1/2011 | Beeson et al. |
| 7,971,632 B2 | 7/2011 | Eriksen |
| 8,055,399 B2 | 11/2011 | Wyatt et al. |
| 8,066,492 B2 | 11/2011 | Rogner |
| 8,080,909 B2 | 12/2011 | Perkins |
| 8,143,754 B2 | 3/2012 | Berger et al. |
| 8,169,110 B2 | 5/2012 | Swales et al. |
| 8,191,342 B2 | 6/2012 | Ishii et al. |
| 8,227,948 B1 | 7/2012 | Fox et al. |
| 8,232,697 B2 | 7/2012 | Chiba et al. |
| 8,328,673 B2 | 12/2012 | Smith et al. |
| 8,459,389 B2 | 6/2013 | Myers et al. |
| 8,487,489 B2 | 7/2013 | Palafox et al. |
| 8,499,869 B2 | 8/2013 | Cimatti et al. |
| 8,615,976 B1 | 12/2013 | Hauser et al. |
| 8,807,114 B2 | 8/2014 | Itakura |
| 8,808,124 B2 | 8/2014 | Major et al. |
| 9,080,293 B2 | 7/2015 | Graner et al. |
| 9,114,798 B1 | 8/2015 | Fox et al. |
| 9,115,720 B2 | 8/2015 | Rosinski et al. |
| 9,115,794 B2 | 8/2015 | Vanderzyden et al. |
| 9,168,670 B2 | 10/2015 | Bergquist et al. |
| 9,187,880 B2 | 11/2015 | Tsuruga et al. |
| 9,190,887 B2 | 11/2015 | Ito et al. |
| 9,197,115 B2 | 11/2015 | Kubes et al. |
| 9,840,143 B1 | 12/2017 | Keller et al. |
| 9,855,833 B2 | 1/2018 | Gale et al. |
| 9,867,331 B1 | 1/2018 | Siudyla et al. |
| 9,868,343 B2 | 1/2018 | Uranaka et al. |
| 9,896,822 B2 | 2/2018 | Kohno et al. |
| 9,906,172 B2 | 2/2018 | Ross |
| 10,093,169 B1 | 10/2018 | Keller et al. |
| 10,106,027 B1 | 10/2018 | Keller |
| 10,358,040 B1 | 7/2019 | Keller |
| 2004/0045749 A1 | 3/2004 | Jaura et al. |
| 2006/0091730 A1 | 5/2006 | Chiao |
| 2008/0121195 A1 | 5/2008 | Sobotzik |
| 2008/0318729 A1 | 12/2008 | Asao et al. |
| 2009/0013952 A1* | 1/2009 | Deniston ............... B60K 6/485 123/179.28 |
| 2009/0291794 A1 | 11/2009 | Amanuma et al. |
| 2012/0161554 A1 | 6/2012 | Ghelardi et al. |
| 2013/0043747 A1 | 2/2013 | Kubes |
| 2013/0269456 A1 | 10/2013 | Jones |
| 2015/0059328 A1 | 3/2015 | Suzuki et al. |
| 2015/0064030 A1 | 3/2015 | Suzuki et al. |
| 2015/0132163 A1 | 5/2015 | Wright et al. |
| 2015/0246607 A1 | 9/2015 | Matsuda |
| 2015/0333379 A1 | 11/2015 | Janarthanam et al. |
| 2016/0238004 A1 | 8/2016 | Charwot et al. |

* cited by examiner

DRIVE AND COOLING SYSTEM FOR UTILITY VEHICLE

CROSS-REFERENCE

This application is a continuation of U.S. patent application Ser. No. 15/182,869, filed on Jun. 15, 2016, which claims the benefit of U.S. Provisional Application Ser. No. 62/175,647, filed on Jun. 15, 2015. The prior applications are incorporated herein by reference in their entirety.

BACKGROUND OF THE INVENTION

This application relates to utility vehicles generally and in particular to zero turn radius utility vehicles having hydraulic pump and hydraulic motor drive systems, and related components thereof. This application is also related to commonly-owned U.S. patent application Ser. Nos. 15/160,331 and 15/170,137, the terms of which are incorporated herein by reference in their entirety.

SUMMARY OF THE INVENTION

A vehicle drive and cooling system that includes hydraulic drive, electrical power generation and at least two separate cooling circuits used to cool two or more components of the vehicle is disclosed herein.

One of the cooling circuits may include a combined generator and circulating pump assembly wherein components on the vehicle are powered by the generator, and one or more of these same (or other) components are cooled by the circulating pump utilizing a first coolant fluid source. As used herein, the term "circulating pump" is intended to mean a pump for circulating coolant fluid in various applications.

The vehicle drive and cooling system may also include at least one other cooling circuit that includes a combined hydraulic pump and circulating pump assembly, wherein the hydraulic pump utilizes a hydraulic fluid source to drive a wheel of the vehicle and the circulating pump may share the first coolant fluid source or utilize a second coolant fluid source to cool one or more vehicle components.

The generator and circulating pump combination is driven by an output shaft of a prime mover such as an internal combustion engine. A pulley is provided as part of the pump assembly to provide a compact unit, whereby the output shaft of the prime mover may also drive a conventional belt and pulley system that drives a pair of hydraulic pumps, at least one of which is a combined hydraulic pump and circulating pump assembly.

Each hydraulic pump and circulating pump assembly of a vehicle having a pair of hydraulic pump and circulating pump assemblies may be driven by a single input shaft that drives a variable speed axial piston pump (and optionally, a charge pump) utilizing the hydraulic fluid source, and a coolant circulating pump utilizing the first coolant fluid source, or a second coolant fluid source, or a third coolant fluid source.

In another hydraulic pump and circulating pump combination, the single input shaft also drives a hydraulic auxiliary pump that may share the hydraulic fluid source used by the hydraulic pumps or may utilize a second hydraulic fluid source.

A better understanding of the objects, advantages, features, properties and relationships of the invention and its elements will be obtained from the following detailed description and accompanying drawings which set forth illustrative embodiments that are indicative of the various ways in which the principles of the invention may be employed.

DETAILED DESCRIPTION OF THE DRAWINGS

Figure 1:
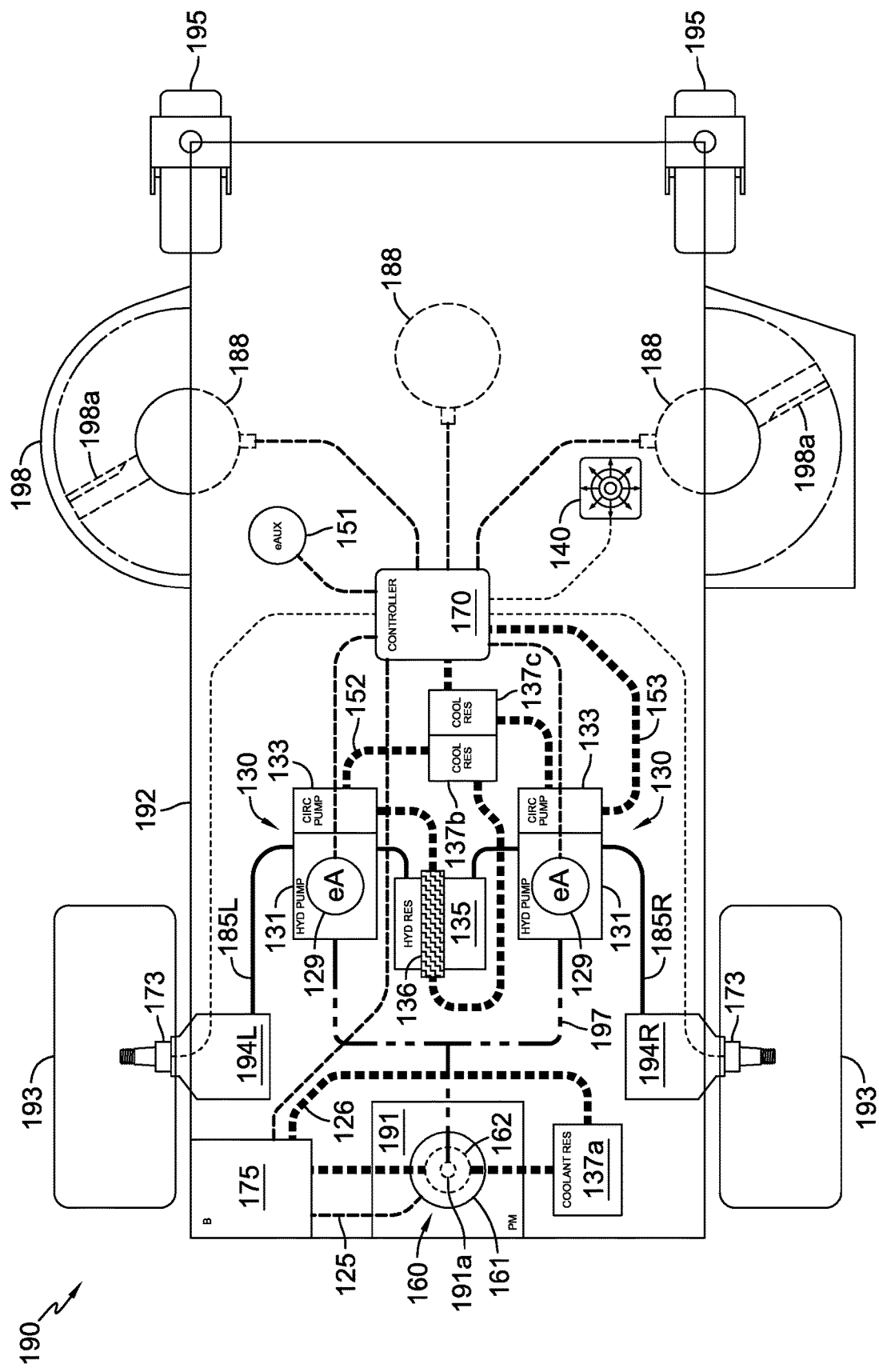
FIG. 1 is a schematic representation of a ride-on, zero turn radius vehicle using a combined generator and circulating pump assembly and a pair of combined hydraulic and circulating pump assemblies in a hydraulic drive system.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. It should also be noted that the drawings set forth herein are representational and not necessarily drawn to scale, and some proportions may be exaggerated to more clearly depict certain features. In certain cross-sectional views, not all elements (such as input shafts) are shown as cross-sectioned, where such cross-sectioning would overly complicate the figures and not aid in the understanding of the disclosure. Certain elements (such as circulating pumps that may vary in design depending on a particular application) are depicted schematically, or depicted but not described in detail, where a detailed depiction or description is not necessary for a complete understanding of the disclosure by one of skill in the art. This specification is intended to be taken as a whole and interpreted in accordance with the principles of the invention as taught herein and as understood by one of ordinary skill in the art.

Figure 2:
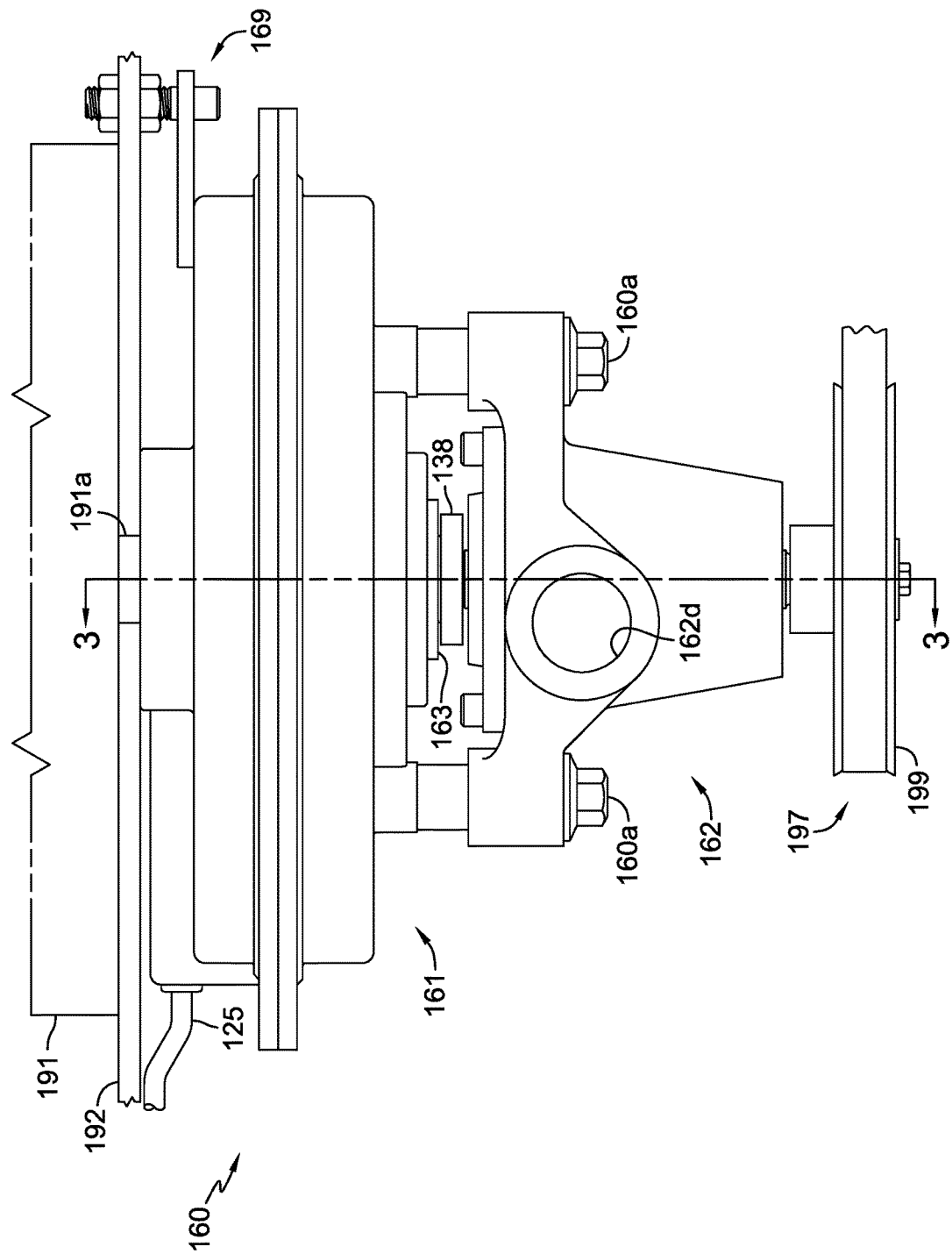
FIG. 2 is a side elevational view of the combined generator and circulating pump assembly used in the vehicle of FIG. 1.
Figure 3:
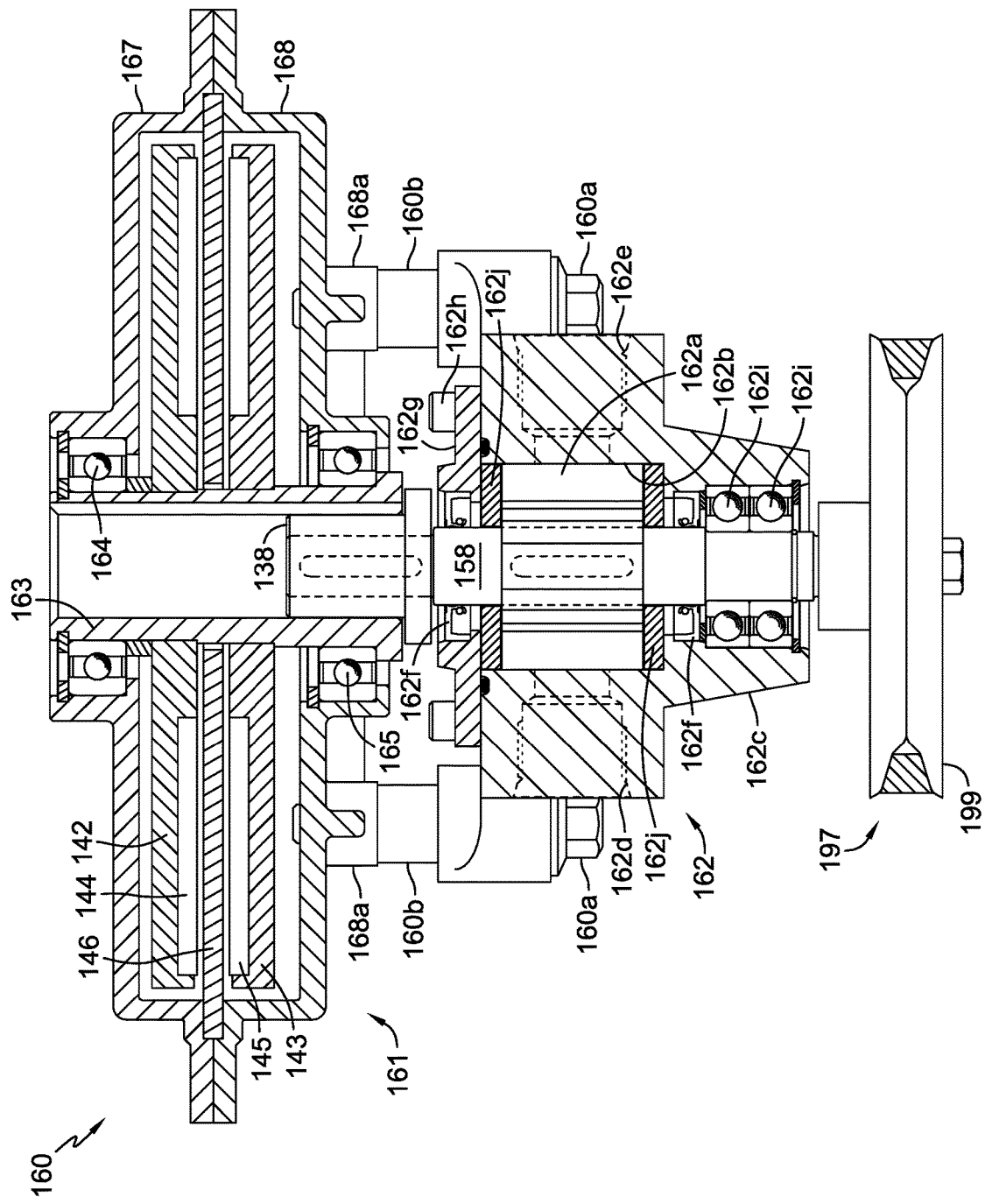
FIG. 3 is a cross-sectional view of the combined generator and circulating pump assembly of FIG. 2, along the line 3-3.
Figure 4:
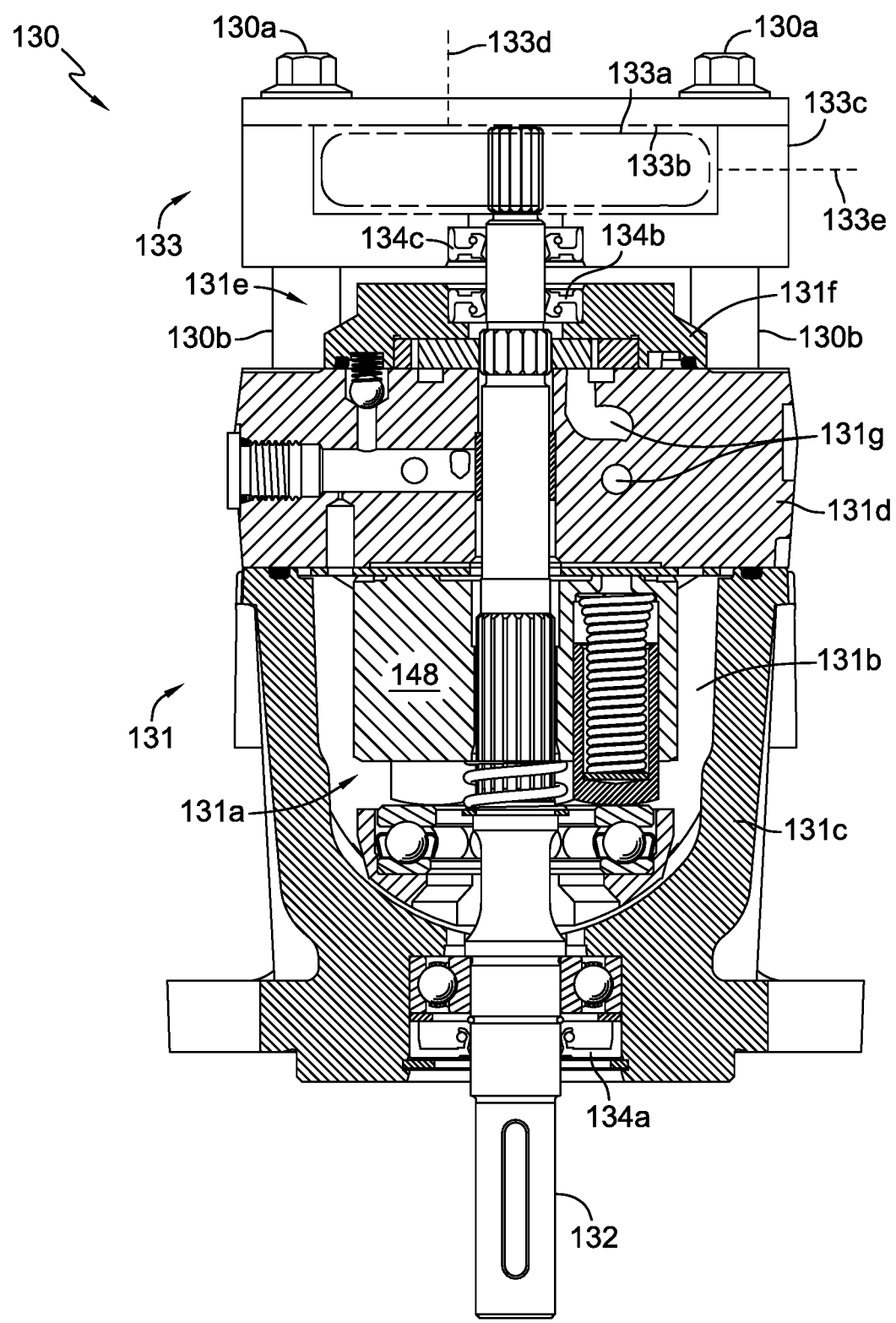
FIG. 4 is a cross-sectional, partially schematic view of one of the pair of combined hydraulic and circulating pump assemblies used in the vehicle of FIG. 1.

FIG. 1 depicts a representative utility vehicle 190, in this instance a ride-on mower, having a vehicle frame 192 supported by a pair of front caster wheels 195 and a pair of rear drive wheels 193, and FIGS. 2, 3 and 4 depict certain components of vehicle 190 in more detail. Vehicle 190 is powered by a prime mover 191, most commonly an internal combustion engine. An output shaft 191a of prime mover 191 drives a combined generator and circulating pump assembly 160 to continuously maintain electrical charge in a battery 175. Combined generator and circulating pump assembly 160 includes an electric power generating device that is depicted herein as generator 161. Alternatively, generator 161 could be a high capacity alternator or the like. Combined generator and circulating pump assembly 160 also includes a coolant circulating pump 162 that receives cooling fluid by means of a first set of coolant lines 126 from a first coolant reservoir 137a and, in this embodiment, pumps the cooling fluid to battery 175 and back to coolant reservoir 137a. It will be understood that battery 175 will incorporate a cooling structure (not shown) through which the coolant fluid will be pumped.

A mowing deck 198 is equipped with one or more rotatable cutting blades 198a driven by one or more electric deck motors 188. Electric deck motors 188 are selectively powered by battery 175 via controller 170. Controller 170 may control each deck motor 188 independently, and the power output to each deck motor 188 may be based on work load or other criteria. Similar electric deck motors and deck motor control systems are described in commonly-owned U.S. Pat. Nos. 8,227,948 and 8,055,399, respectively, both of which are incorporated herein by reference.

The output shaft 191a of prime mover 191 also continuously drives a belt and pulley assembly 197 (or other power transfer means) engaged to a pair of combined hydraulic and circulating pump assemblies 130, each comprising a hydraulic pump assembly 131 and a circulating pump 133. As shown in FIGS. 2 and 3, belt and pulley assembly 197 comprises a pulley 199 connected to and forming a part of the generator and pump assembly 160 to form a more compact unit. In this depicted embodiment, the pulley 199 is disposed below pump housing 162c, and each of the generator 161, circulating pump 162 and pulley 199 are driven, directly or indirectly by input tube 163, which in turn is driven by output shaft 191a of prime mover 191. Pulley 199 is engaged to and driven by input shaft 158. Each hydraulic pump assembly 131 is connected by hydraulic lines such as hydraulic lines 185L, 185R to a hydraulic fluid reservoir 135 and to hydraulic motors 194L, 194R, each powering a rear drive wheel 193. The pump assemblies 131 and hydraulic motors 194L and 194R form a pair of power transfer mechanisms, and the combination of pump assemblies 131, hydraulic lines 185L, 185R, reservoir 135 and hydraulic motors 194L and 194R form a first hydraulic fluid circuit. In this embodiment, the coolant circulating pumps 133 receive cooling fluid from two separate coolant fluid reservoirs 137b and 137c.

Hydraulic drive line sets of hydraulic pump and motor drives are well known in zero turn radius vehicles and are therefore represented simply by generic lines of communication in order to improve the clarity of the vehicle schematics provided herein; e.g., a single schematic line such as hydraulic lines 185L, 185R each may represent a pair of hydraulic lines. It should also be noted that hydraulic motors used in vehicles such as those represented herein may sometimes include a hydraulic line (not shown in order to simplify schematics) to an external reservoir, such as reservoir 135. An exemplary hydraulic motor for use in connection with these embodiments is depicted in commonly-owned U.S. Pat. No. 6,811,510, the terms of which are incorporated herein by reference, or it could also be a motor such as that currently sold by Hydro-Gear of Sullivan, Ill. as the HGM-H Motor.

As illustrated schematically in FIG. 1, a second coolant fluid reservoir 137b and a third coolant fluid reservoir 137c can be structured as a partitioned reservoir having separate chambers. Coolant fluid reservoirs 137b and 137c may have an insulating barrier interposed between them or, alternatively, they may be structured as two separate reservoirs spaced apart from one another. In this embodiment, one of the circulating pumps 133 sends cooling fluid through a second set of coolant lines 152 to a heat exchanger 136 associated with hydraulic fluid reservoir 135 and back to the second coolant fluid reservoir 137b. The other circulating pump 133 sends cooling fluid through a third set of coolant lines 153 to a separate cooling structure (not shown) and back to the third coolant fluid reservoir 137c. In this embodiment, this separate cooling structure (not shown) is associated with controller 170.

The cooling fluids used in these three cooling circuits comprising coolant fluid reservoirs 137a, 137b and 137c, may be of the same formulation in all three cooling circuits or each fluid formulation may be tailored for its individual purpose, desired performance characteristics and operating temperature range. Also, by way of example, the coolant fluid used in coolant fluid reservoir 137a may have a first formulation and the coolant fluid used in coolant reservoirs 137b and 137c may have a second, shared formulation.

It should be noted that each of the coolant fluid reservoirs 137a, 137b and 137c may also include a heat exchanger component as needed, dependent on vehicle system requirements and, conversely, hydraulic fluid reservoir 135 may not require a heat exchanger component in some vehicle systems. Coolant fluid reservoirs 137a, 137b and 137c may be constructed of a material such as aluminum and may include features such as fins or ribs to improve heat dissipation.

A power source, such as battery 175, supplies electrical energy to power various electrical components, such as one or more optional electric auxiliary devices or motors 151, switches and indicator lights involved in vehicle control, and standard vehicle systems such as an ignition system (in the event prime mover 191 is an internal combustion engine).

Battery 175 also supplies energy via controller 170 to a pair of electric actuators 129 that control the hydraulic pump assemblies 131. Electric actuators 129 can be as depicted in commonly-owned U.S. Pat. No. 9,114,798, incorporated herein by reference. Each electric actuator 129 is independently controlled by controller 170 receiving and processing operator input from joystick 140 or other known operator input devices, such as operator control levers or a steering wheel and accelerator pedal (all equipped with position sensors or potentiometers) to adjust the output of its corresponding hydraulic pump assembly 131, thereby adjusting the rotational speed and direction of the corresponding hydraulic motor 194L, 194R and rear drive wheel 193. A speed sensor 173 monitors the rotational output of each hydraulic motor 194L, 194R at the axle to provide feedback to controller 170. As a result, the speed and steered direction of vehicle 190 is determined, including the potential execution of zero radius turns when each of the rear drive wheels 193 is driven in the opposite rotational sense.

A combined generator and circulating pump assembly 160, such as can be used in vehicle 190 of FIG. 1, is shown in FIGS. 2 and 3, where it can be seen to include a low profile generator 161 having upper housing member 167 and lower housing member 168 forming a single generator housing. Generator 161 comprises a stator 146 fixed within housing members 167 and 168 and incorporates coil windings applied to stator 146 in a known manner. Magnets 144 and 145 are fixed on upper rotor 142 and lower rotor 143, respectively, to rotate adjacent to stator 146 and generate an electric current in a known manner. Alternatively, a more conventional low profile generator design (not shown) can be used, wherein magnets are attached to a central rotor, and coil windings are applied to a cylindrical stator positioned about the perimeter of the rotor. The output of generator 161 is provided to battery 124 by means of conductor 125. At least one anti-rotation device 169 is provided to prevent rotation of generator/circulating pump assembly 160 in relation to the vehicle frame 192.

Circulating pump 162 is attached to the lower housing member 168 using fasteners 160a. A spacer structure such as stand-offs 160b is provided to create separation to help maintain a temperature differential between the generator 161 and the circulating pump 162 by allowing cooling airflow around both. Stand-offs 160b can be formed as one or more separate components or they can be formed integrally with the pump main housing 162c. Additionally, pump mounting structure 168a can be formed on lower housing member 168 to help create separation and improve cooling airflow between generator 161 and circulating pump 162. A rotatable input member, or input receiving member, namely input tube 163, extends through generator 161 and is supported by upper bearing 164 in upper housing member 167 and by lower bearing 165 in lower housing member 168. It is preferred that each of the bearings 164, 165 be sealed bearings to eliminate the need for additional seals, thereby helping to reduce the overall height of the unit. Output shaft 191a of prime mover 191 will extend into the input tube 163 and is connected thereto by known means, such as splines, flats, keyway (shown), etc., to rotate therewith.

Similarly, an adapter coupling 138 extends into the opposite end of input tube 163 and an input shaft 158 of circulating pump 162 engages adapter coupling 138 in a known manner to rotate therewith. Input shaft 158 extends through a first seal 162f located in housing cover 162g to engage a fluid moving element or impeller 162a disposed in cooling fluid in pump chamber 162b of circulating pump 162. Impeller 162a may be made of rubber or an elastomeric material and runs on a pair of wear washers 162j. Input shaft 158 also extends through a second seal 162f located in main housing 162c and a pair of (preferably) sealed shaft support bearings 162i mounted in main housing 162c. The pair of shaft support bearings 162i is illustrated in a stacked arrangement, but they may be separated to improve load distribution and shaft alignment if necessary. It is also possible to use a single heavier duty bearing in lieu of the pair of shaft support bearings 162i. One or more weep holes (not shown) may be included external to seals 162f to visually indicate seal leakage. In the embodiment shown, input shaft 158 extends through housing cover 162g, attached to main housing 162c with a plurality of fasteners 162h, and through main housing 162c to drive the belt and pulley assembly 197.

It will be understood that other rotatable input means can be used to connect with an output shaft of the prime mover and transfer the rotational movement as outlined herein, in place of the disclosed input tube 163. For example, a coupling could be used to connect output shaft 191a to a solid steel generator input shaft (not shown) used in place of input tube 163, and a different style of coupling replacing coupling 138 could then be used to connect this alternate generator input shaft to the pump input shaft 158.

Circulating pump 162 includes a fluid inlet 162d and a fluid outlet 162e. The arrangement of the fluid inlet 162d and fluid outlet 162e on opposite sides of pump input shaft 158 as shown is useful for a through-shaft pump configuration as illustrated in this embodiment. However, the size and specific design of circulating pump 162 may vary based on type of coolant fluid used, viscosity, operating temperature range, duty cycle, etc.

The circulating pump 162 illustrated herein is an appropriate pump for use with a water-based antifreeze solution as is commonly used in automotive applications. A centrifugal pump is an alternative, well-known style of automotive water pump, but it may be less desirable to attempt the substitution of such a centrifugal pump into a low profile generator and through-shaft pump configuration such as is illustrated herein. In another embodiment, depending on the cooling fluid used, e.g. an oil-based fluid, a gerotor-style pump with through-shaft may be used in place of pump 162, possibly resulting in a lower profile generator and pump assembly.

As is known, a variety of fluids are available for use in computer cooling systems and battery cooling systems. Some of these fluids may be used to cool the controller 170 and/or battery 175 and/or other components of vehicle 190.

FIG. 4 depicts an embodiment of the combined hydraulic and circulating pump assembly 130 comprising a variable speed hydraulic pump assembly 131 and a generically illustrated circulating pump assembly 133, both driven by a single input shaft 132. Pump assembly 131 includes axial piston pump 131a driven by input shaft 132. Axial piston pump 131a is disposed in hydraulic fluid in pump chamber 131b formed by joining main housing 131c and end cap 131d. Axial piston pump 131a comprises a cylinder block 148 that runs either directly on end cap 131d or on a valve plate mounted on end cap 131d, as is known in the art, and is connected to hydraulic porting 131g formed in end cap 131d. The basic construction of pump assembly 131 is known in the art, and is disclosed in commonly-owned U.S. Pat. No. 6,332,393, the terms of which are incorporated herein by reference. In each embodiment depicted herein, certain elements of the pump assemblies such as the axial pistons, swash plates, and the like are depicted but not described in detail as such details are known to one of skill in the art. Furthermore, details of certain elements that are shown, such as the hydraulic porting formed in end cap 131d, the hydraulic fluid circuits, coolant moving elements, and the like will be understood by those of skill in the art even though they are not depicted in their entirety and not every element forming such components is described herein.

An optional charge pump 131e runs on the opposite side of end cap 131d and is retained by charge cover 131f. Input shaft 132 extends through end cap 131d and charge cover 131f to engage a fluid moving element 133a disposed in cooling fluid in pump chamber 133b within housing 133c of circulating pump 133.

Shaft seals 134a and 134b retain hydraulic fluid in pump assembly 131 and shaft seal 134c retains cooling fluid in pump chamber 133b. The separate shaft seals 134b and 134c prevent cross-contamination of hydraulic and cooling fluids. That is, shaft seals 134b and 134c ensure separation of hydraulic fluid in pump chamber 131b from cooling fluid in pump chamber 133b under normal operating conditions. A spacer structure such as stand-offs 130b is provided to help maintain a temperature differential between pump assembly 131 and circulating pump 133 and create separation between shaft seals 134b and 134c. Stand-offs 130b can either be separate components or they can be formed integrally with pump housing 133c. Fasteners 130a can extend through housing 133c, stand-offs 130b and end cap 131d to engage main housing 131c. Optionally, fasteners 130a could mount the circulating pump 133 to end cap 131d or to a bracket (not shown) mounted on end cap 131d.

Circulating pump 133 includes at least one fluid inlet 133d and one fluid outlet 133e, shown schematically in FIG. 4. These can be configured as needed depending on the design details of circulating pump 133. The size and specific design of circulating pump 133 can vary significantly based on type of coolant fluid used, viscosity, operating temperature range, duty cycle, etc. The cooling fluid pumped by circulating pump 133 could be a water-based antifreeze solution or it could be the same hydraulic fluid used by pump assembly 131, but flowing in a separate cooling circuit. Also, as mentioned previously herein, a variety of fluids are available for use in computer cooling systems and could be applied to cool controllers or other components of a utility vehicle such as vehicle 190. Depending on cooling system parameters and the type of cooling fluid used, circulating pump 133 may include an impeller as depicted in pump 162. Alternatively, circulating pump 133 could be similar in design to a common automotive centrifugal water pump, or it could be a gerotor-style pump similar to charge pump 131e, again depending on cooling system parameters and type of cooling fluid used.

It will be understood that pump assembly 130 could be modified such that input shaft 132 extends through circulating pump assembly 133 (and through an additional shaft seal in housing 133c) to enable attachment of a fan to the modified input shaft 132 as disclosed in commonly-owned U.S. patent application Ser. No. 15/160,331.

FIGS. 5, 6, 7 and 9 depict additional embodiments of vehicles in accordance with this disclosure. There are certain similarities between the various vehicle embodiments disclosed herein, and features that bear a similar number but a different prefix, such as 151, 251, 351, may be considered to be substantially identical to the earlier described features.

Figure 5:
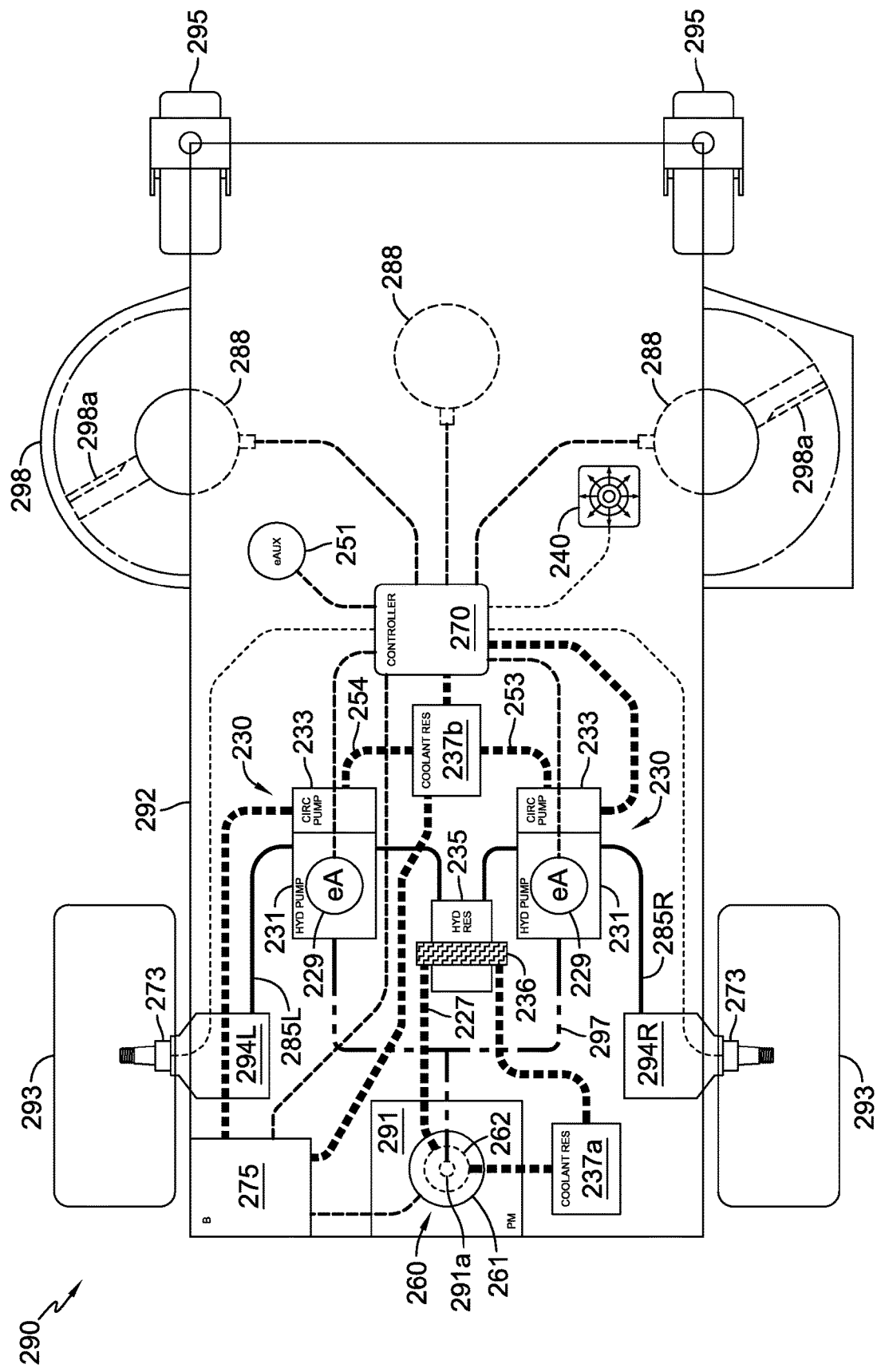
FIG. 5 is a schematic representation of a second embodiment of a ride-on, zero turn radius vehicle using a combined generator and circulating pump assembly of FIG. 2 and a pair of combined hydraulic and circulating pump assemblies of FIG. 4 in a hydraulic drive system.

FIG. 5 depicts a representative hybrid utility vehicle 290 that is also a ride-on mower similar in some aspects to utility vehicle 190. An output shaft 291a of prime mover 291 drives a combined generator and circulating pump assembly 260 that is the same as or similar to previously described pump assembly 160 to continuously maintain electrical charge in a battery 275 via generator 261. A mowing deck 298 is equipped with one or more rotatable cutting blades 298a driven by one or more electric deck motors 288. Electric deck motors 288 are selectively powered by battery 275 via controller 270. Similar to vehicle 190, utility vehicle 290 may also include one or more optional electric auxiliary devices or motors 251 powered by battery 275 via controller 270 or an additional controller (not shown).

In utility vehicle 290, combined generator and circulating pump assembly 260 includes coolant circulating pump 262 that receives cooling fluid by means of a first set of coolant lines 227 from a first coolant reservoir 237a and pumps the cooling fluid through a heat exchanger 236 associated with hydraulic fluid reservoir 235 and back to coolant reservoir 237a in a first cooling circuit.

The output shaft 291a of prime mover 291 also continuously drives a belt and pulley assembly 297 (or other power transfer means) engaged to a pair of combined hydraulic and circulating pump assemblies 230, each similar to the combined hydraulic and circulating pump assembly 130 described previously herein. Hydraulic pumps 231 are connected by hydraulic lines such as hydraulic lines 285L, 285R to hydraulic fluid reservoir 235 and to hydraulic motors 294L, 294R, each powering a rear drive wheel 293. Each coolant circulating pump 233 receives cooling fluid from a second coolant fluid reservoir 237b shared by two additional cooling circuits. In this vehicle system, one of the pair of circulating pumps 233 is used to cool the battery 275 by means of a second set of coolant lines 254 and the other circulating pump 233 is used to cool the controller 270 by means of a third set of coolant lines 253. Reservoir 237b can include a heat exchanger component as needed, dependent on vehicle system requirements. Reservoir 237b may also be configured as two separate reservoirs or a partitioned reservoir and may include an insulating barrier as previously described herein.

Battery 275 also supplies energy via controller 270 to a pair of electric actuators 229 that control the hydraulic pumps 231. Each electric actuator 229 is independently controlled by controller 270 receiving and processing operator input from joystick 240 (or other known operator input devices, as previously stated) to adjust the output of its corresponding hydraulic pump 231, thereby adjusting the rotational speed and direction of the corresponding hydraulic motor 294L, 294R and rear drive wheel 293. A speed sensor 273 monitors the rotational output of each hydraulic motor 294L, 294R at the axle to provide feedback to controller 270. As a result, the speed and steered direction of vehicle 290 is determined, including the potential execution of zero radius turns when each of the rear drive wheels 293 is driven in the opposite rotational sense.

Figure 6:
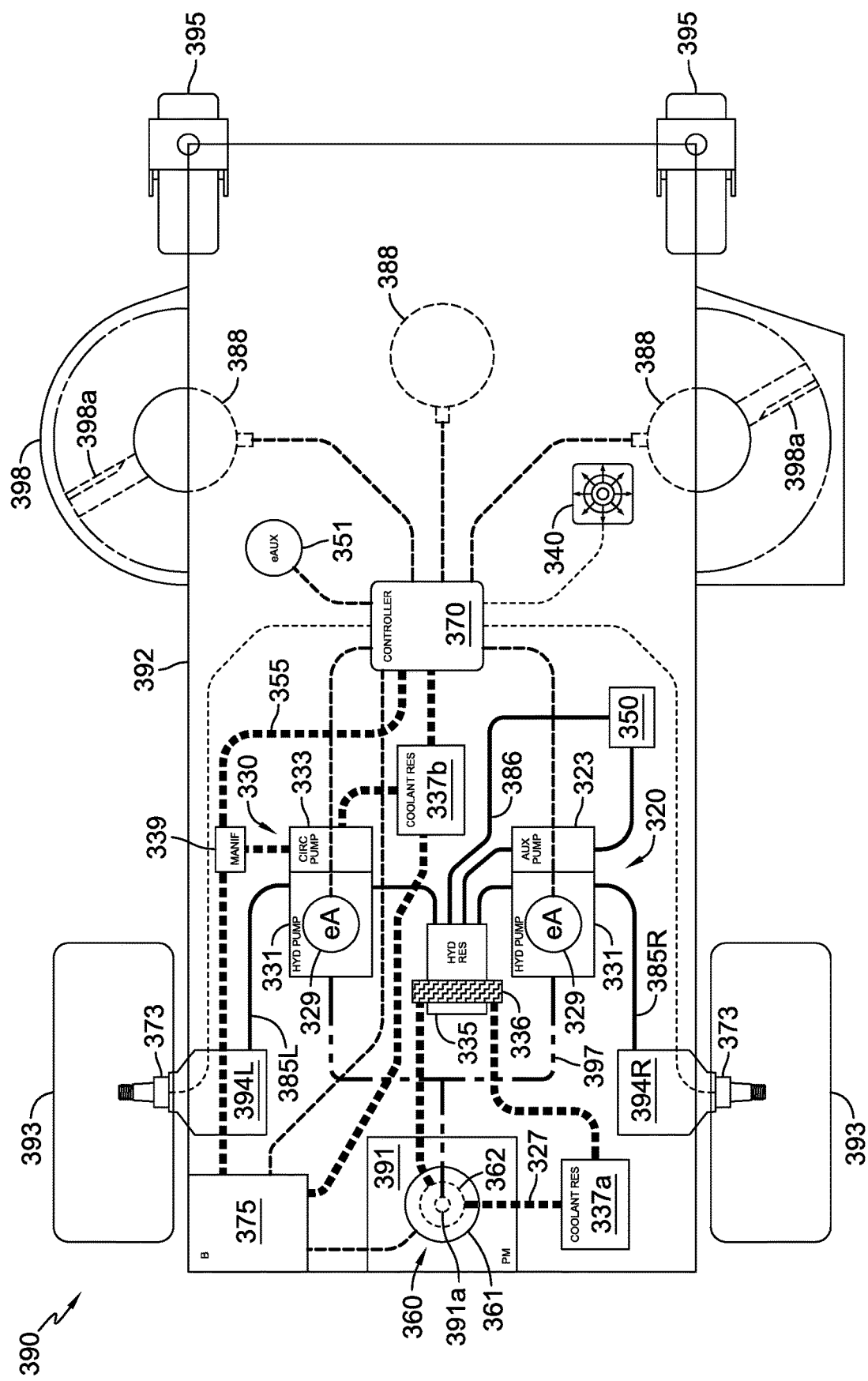
FIG. 6 is a schematic representation of a third embodiment of a ride-on, zero turn radius vehicle using a combined generator and circulating pump assembly of FIG. 2, a combined hydraulic drive and circulating pump assembly of FIG. 4 and a combined hydraulic drive and auxiliary pump assembly in a hydraulic drive system.

FIG. 6 depicts a representative hybrid utility vehicle 390 that is a ride-on mower similar to previously described utility vehicle 290. An output shaft 391a of prime mover 391 drives a combined generator and circulating pump assembly 360 that is the same as or similar to previously described generator and circulating pump assembly 160 to continuously maintain electrical charge in a battery 375 via generator 361. Similar to utility vehicle 290, combined generator and circulating pump assembly 360 includes coolant circulating pump 362 that receives cooling fluid by means of a first set of coolant lines 327 from a first coolant reservoir 337a and pumps the cooling fluid through a heat exchanger 336 associated with hydraulic fluid reservoir 335 and back to coolant reservoir 337a.

Output shaft 391a also continuously drives a belt and pulley assembly 397. In vehicle 390, however, belt and pulley assembly 397 is engaged to one combined hydraulic and circulating pump assembly 330, similar to combined hydraulic and circulating pump assembly 130 described previously herein, and to one combined hydraulic and auxiliary pump assembly 320 that is known in the art. The basic construction of combined hydraulic and auxiliary pump assembly 320 is disclosed in commonly-owned U.S. Pat. No. 6,332,393. Hydraulic pumps 331 of pump assemblies 320 and 330 are connected by hydraulic lines 385L, 385R to hydraulic fluid reservoir 335 and to hydraulic motors 394L, 394R, each powering a rear drive wheel 393. In this vehicle system, the circulating pump 333 of combined hydraulic and circulating pump assembly 330 receives cooling fluid by means of a second set of coolant lines 355 from a second coolant fluid reservoir 337b and pumps it through a manifold 339 to cool both the battery 375 and the controller 370. Auxiliary pump 323 of combined hydraulic and auxiliary pump assembly 320 is available to power any suitable auxiliary hydraulic device 350 of vehicle 390. Similar to vehicles 190 and 290, utility vehicle 390 may also include one or more optional electric auxiliary devices or motors 351 powered by battery 375 via controller 370 or an additional controller (not shown).

Figure 7:
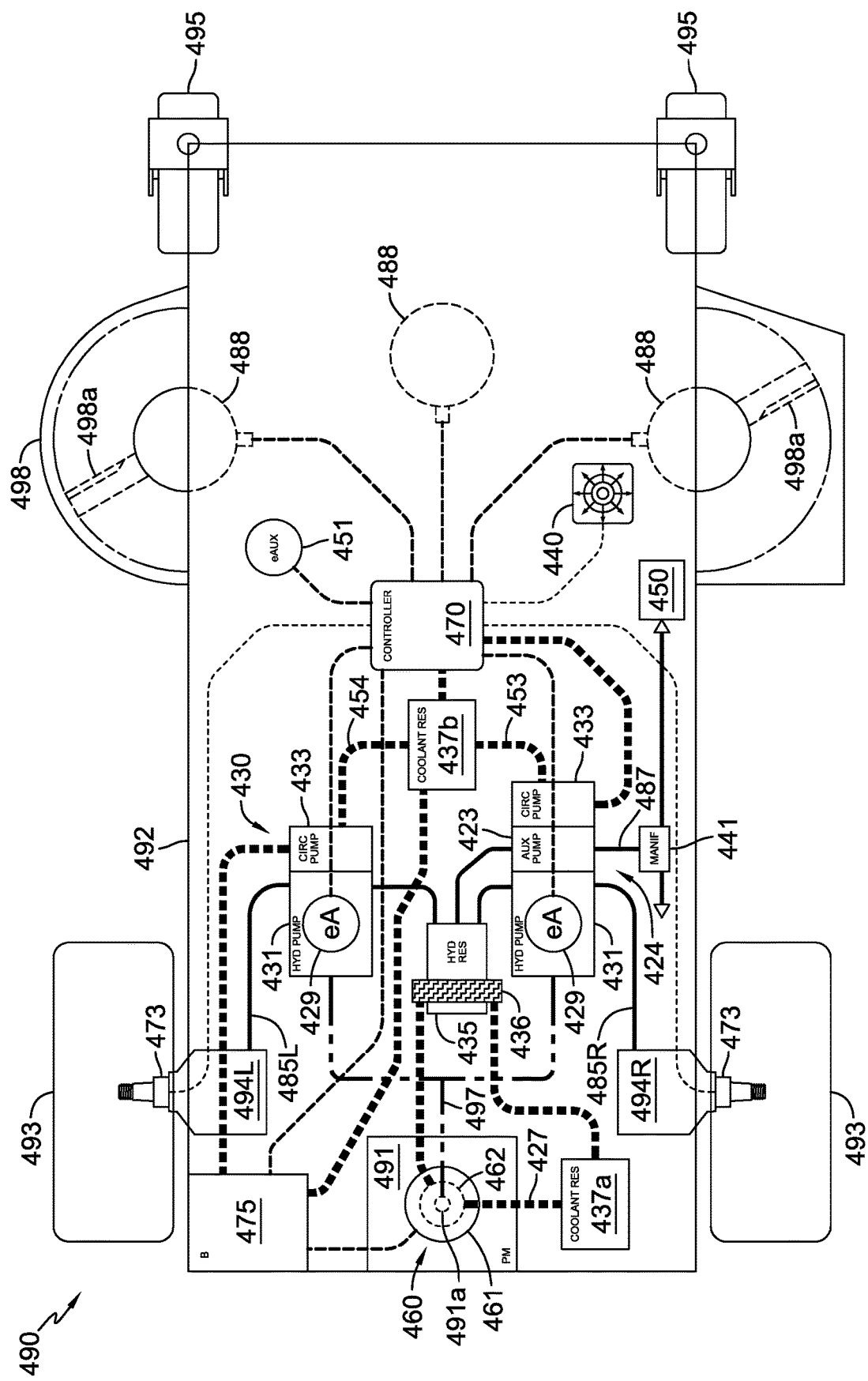
FIG. 7 is a schematic representation of a fourth embodiment of a ride-on, zero turn radius vehicle using a combined generator and circulating pump assembly of FIG. 2, a combined hydraulic drive pump and circulating pump assembly of FIG. 4, and a combined hydraulic drive pump/auxiliary pump/circulating pump assembly in a hydraulic drive system.

FIG. 7 depicts a representative hybrid utility vehicle 490 that is a ride-on mower similar to utility vehicles 190, 290 and 390, described previously herein. An output shaft 491a of prime mover 491 drives a combined generator and circulating pump assembly 460 that is the same as or similar to previously described generator and circulating pump assembly 160 to continuously maintain electrical charge in a battery 475 via generator 461. Similar to utility vehicles 290 and 390, combined generator and circulating pump assembly 460 includes coolant circulating pump 462 that receives cooling fluid from a first coolant reservoir 437a and pumps the cooling fluid by means of a first set of coolant lines 427 through a heat exchanger 436 associated with hydraulic fluid reservoir 435 and back to coolant reservoir 437a. In vehicle 490, belt and pulley assembly 497 is engaged to one combination pump assembly 430, similar to combination pump assembly 130 described previously herein, and to one combined hydraulic drive pump/auxiliary pump/circulating pump assembly 424.

Figure 8:
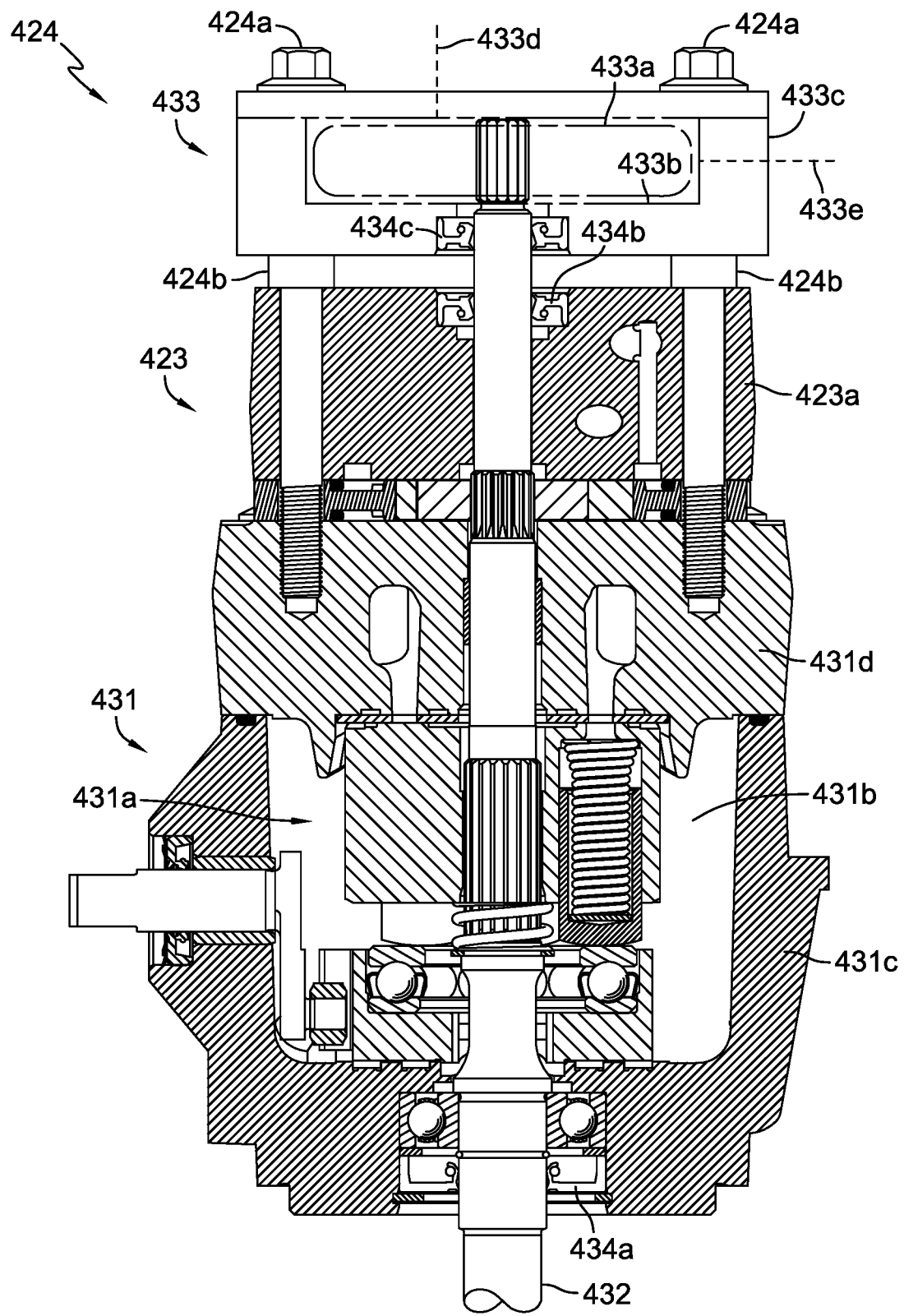
FIG. 8 is a cross-sectional, partially schematic view of the combined hydraulic drive pump/auxiliary pump/circulating pump assembly used in the vehicle of FIG. 7.

As shown in FIG. 8, the pump assembly 424 includes a variable speed hydraulic pump 431, an auxiliary pump 423 that includes a port block 423a, and a circulating pump 433, all driven by a single input shaft 432. Stand-offs 424b help maintain a temperature differential between auxiliary pump 423 and circulating pump 433 and create separation between shaft seals 434b and 434c. Fasteners 424a extend through housing 433c, stand-offs 424b, and port block 423a to engage end cap 431d. Shaft seals 434a and 434b retain hydraulic fluid in pump assembly 431 and auxiliary pump 423, while shaft seal 434c retains cooling fluid in pump chamber 433b.

As further illustrated in FIG. 7, each coolant circulating pump 433 receives cooling fluid from a second coolant fluid reservoir 437b. Auxiliary pump 423 can either share hydraulic fluid from reservoir 435 with hydraulic pump assembly 431 as shown or utilize a separate hydraulic fluid reservoir (not shown). Similar to vehicle 290, one of the pair of circulating pumps 433 is used to cool the battery 475 by means of a second set of coolant lines 454 and the other circulating pump 433 is used to cool the controller 470 by means of a third set of coolant lines 453. Similar to vehicle 390, auxiliary pump 423 is available to power any suitable auxiliary hydraulic device 450 of vehicle 490 by means of a set of hydraulic lines 487 and may power more than one auxiliary hydraulic device as indicated by inclusion of an optional manifold 441 that may include a fluid control valve (not shown). The complete hydraulic circuit for auxiliary pump 423 is not shown in order to simplify the schematic representation of vehicle 490.

Figure 9:
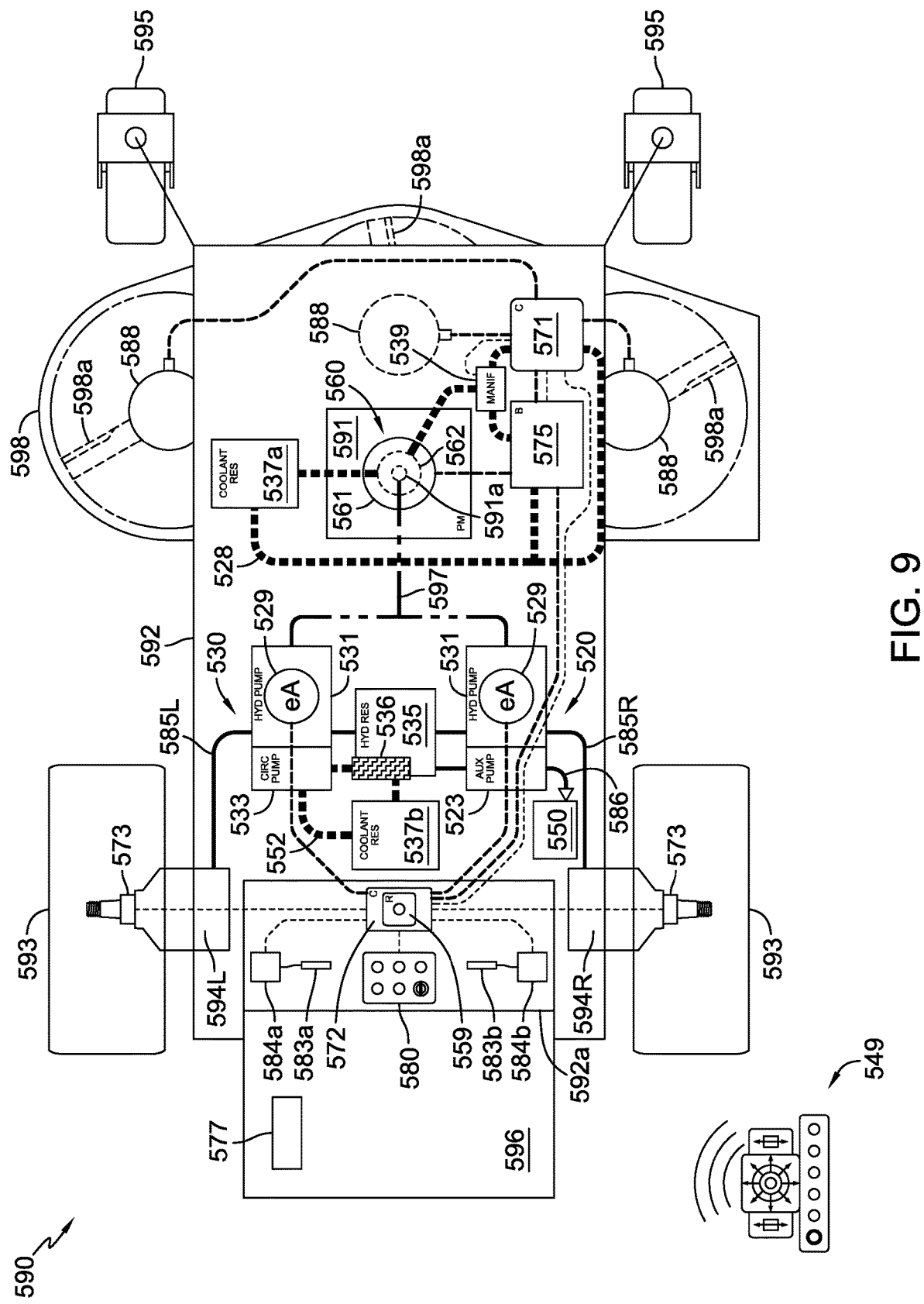
FIG. 9 is a schematic representation of a fifth embodiment of a stand-on, zero turn radius vehicle using a combined generator and circulating pump assembly of FIG. 2, a combined hydraulic drive and circulating pump assembly of FIG. 4, and a combined hydraulic drive and auxiliary pump assembly in a hydraulic drive system.

FIG. 9 depicts a representative hybrid utility vehicle 590 that is a stand-on mower similar in some aspects to the ride-on utility vehicles described previously herein and it should be noted that the various hydraulic circuits and coolant circuits shown for this stand-on utility vehicle could be applied in a ride-on utility vehicle and vice versa. An output shaft 591a of prime mover 591 drives a combined generator and circulating pump assembly 560 that is the same as or similar to previously described generator and circulating pump assembly 160 to continuously maintain electrical charge in a battery 575 via generator 561. As illustrated, a drive controller 572, steering levers 583a, 583b, and position sensors 584a, 584b are mounted on a control support tower 592a fixed to vehicle frame 592. An operator platform 596 affixed to vehicle frame 592 proximate to or between the rear drive wheels 593 places the operator in functional proximity to the control support tower 592a. Operation of left-side control lever 583a independently determines the speed and rotational direction of the left-side drive wheel 593, while operation of right-side control lever 583b independently determines the speed and rotational direction of the right-side drive wheel 593. A speed sensor 573 monitors the rotational output of each hydraulic motor 594L, 594R at the axle to provide feedback to the drive controller 572. As a result, the speed and steered direction of vehicle 590 is determined, including the potential execution of zero radius turns.

A control panel 580 may contain an assortment of operator controls such as, for example, a key switch and a deck power switch. Other features may be incorporated, such as providing that vehicle 590 will not start without engagement of a parking brake (not shown), or continue to run absent an activated operator presence pedal/switch 577 if mowing deck 598 is powered.

In addition to onboard controls, vehicle 590 may optionally include remote operator control. A receiver 559, which may be mounted proximate to drive controller 572 on control support tower 592a, receives signals from an operator control transmitter 549. Receiver 559 then transmits operator inputs to the drive controller 572. One or more switches on control panel 580 permit the operator to toggle between remote and onboard operational modes. Further control details may be as depicted in U.S. patent application Ser. No. 14/925,634, now U.S. Pat. No. 9,867,331, the terms of which are incorporated herein by reference.

Mowing deck 598 is equipped with one or more rotatable cutting blades 598a driven by one or more electric deck motors 588. Electric deck motors 588 are selectively powered by battery 575 via deck motor controller 571. Controller 571 may control each deck motor 588 independently, and power output to each deck motor 588 may be based on work load or other criteria. Battery 575 also supplies energy to the drive controller 572, electric actuators 529, various sensors and switches involved in vehicle control, and standard vehicle systems, e.g. an ignition system. Drive controller 572 is in CAN Bus communication with deck motor controller 571. It should be noted that these controllers 571, 572 may be contained in a single housing and may be located as needed in any suitable location on the vehicle. It should also be noted that receiver 559 may or may not be packaged or housed with drive controller 572. These two components can also be located together or separately in any suitable location on the vehicle.

The combined generator and circulating pump assembly 560 includes a coolant circulating pump 562 that receives cooling fluid by means of a first set of coolant lines 528 from a first coolant reservoir 537a and pumps it through a manifold 539 to cool both the battery 575 and the deck motor controller 571. Manifold 539 may include an electronically controlled valve (not shown) to regulate cooling fluid distribution to the battery 575 and controller 571 to prevent overheating of controller 571 and to help maintain an optimal temperature range of battery 575. Improved performance and service life of battery 575 can be achieved through preheating, cooling and charging regulation of battery 575. Battery 575 may include one or more temperature sensors to provide input to controller 571, which in turn controls the operation of the valve associated with manifold 539. Heating of fluid in reservoir 537a during very cold weather can also be utilized to help maintain an optimal temperature range of battery 575. For a mowing vehicle, such as vehicle 590, cooling of battery 575 in hot weather is more likely needed and can prevent damage to battery 575.

The output shaft 591a of prime mover 591 also continuously drives a belt and pulley assembly 597. Similar to vehicle 390, belt and pulley assembly 597 is engaged to one combined hydraulic and circulating pump assembly 530, similar to combined hydraulic and circulating pump assembly 130 described previously herein, and to one combined hydraulic and auxiliary pump assembly 520 that is known in the art. Hydraulic pumps 531 of pump assemblies 520 and 530 are connected by hydraulic lines 585L, 585R to a hydraulic fluid reservoir 535 and to hydraulic motors 594L, 594R, each powering a rear drive wheel 593. The output of each hydraulic pump 531 is independently controlled via communication between drive controller 572 and an electric actuator 529. The circulating pump 533 of combined hydraulic and circulating pump assembly 530 receives cooling fluid by means of a second set of coolant lines 552 from a second coolant fluid reservoir 537b and pumps the cooling fluid through a heat exchanger 536 associated with hydraulic fluid reservoir 535 and back to coolant fluid reservoir 537b. Auxiliary pump 523 of combined hydraulic and auxiliary pump assembly 520 is available to power any suitable auxiliary hydraulic device 550 of vehicle 590.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A vehicle, comprising:
   a prime mover driving an output shaft;
   a pair of driven wheels;
   a plurality of electronic components;
   a first hydraulic motor connected to and driving one of the pair of driven wheels, and a second hydraulic motor connected to and driving the other of the pair of driven wheels;
   a generator driven by the prime mover and comprising a generator housing;
   a first circulating pump assembly engaged to the generator housing and driven by the prime mover;
   a coolant reservoir connected to the first circulating pump assembly, the first circulating pump assembly providing coolant fluid to at least one of the plurality of electronic components;
   a first hydraulic pump engaged to the first hydraulic motor, and a second hydraulic pump engaged to the second hydraulic motor, wherein the first hydraulic pump comprises a first pump housing; and a second circulating pump assembly engaged to the first pump housing and providing coolant fluid to at least one of the plurality of electronic components.

2. The vehicle of claim 1, further comprising a receiver disposed on the vehicle for receiving signals from a remote operator transmitter, thereby permitting remote operation of the vehicle.

3. The vehicle of claim 2, further comprising an operator platform disposed at one end of the vehicle and adjacent the pair of driven wheels, permitting direct user control of the vehicle.

4. The vehicle of claim 2, wherein the plurality of electronic components comprises a controller electrically connected to a battery and to the generator, wherein the controller is electrically engaged to and separately controls the first hydraulic pump and the second hydraulic pump, in response to a user input.

5. The vehicle of claim 2, further comprising a second coolant reservoir located on the vehicle and in communication with the second circulating pump assembly.

6. The vehicle of claim 4, further comprising a mowing deck and a plurality of deck motors disposed on the mowing deck, and the plurality of electronic components further comprises a deck motor controller connected to the plurality of deck motors.

7. The vehicle of claim 2, wherein the second hydraulic pump comprises a second pump housing and an auxiliary pump engaged to the second pump housing, wherein the auxiliary pump is engaged to and powers an auxiliary hydraulic component.

8. The vehicle of claim 7, wherein the first hydraulic pump comprises a first input shaft driving a first pump cylinder block and the first input shaft is also engaged to and drives the second circulating pump assembly, and the second hydraulic pump comprises a second input shaft driving a second pump cylinder block and the second input shaft is also engaged to and drives the auxiliary pump.

9. A vehicle, comprising:
   a prime mover driving an output shaft;
   a pair of power transfer mechanisms, each power transfer mechanism being connected to and driving one of a pair of driven wheels;
   a generator driven by the prime mover and comprising a generator housing supported on the vehicle;
   a controller supported on the vehicle, wherein the controller is electrically engaged to and separately controls the output of the pair of power transfer mechanisms in response to a user input; and
   a plurality of circulating pump assemblies and a plurality of coolant reservoirs, wherein each of the plurality of circulating pump assemblies is in hydraulic communication with at least one of the plurality of coolant reservoirs.

10. The vehicle of claim 9, further comprising a receiver disposed on the vehicle for receiving signals from a remote operator transmitter, thereby permitting remote operation of the vehicle.

11. The vehicle of claim 9, wherein a first circulating pump assembly of the plurality of circulating pump assemblies is mounted on the generator housing, and the generator and the first circulating pump assembly are driven by the output shaft of the prime mover.

12. The vehicle of claim 11, wherein the pair of power transfer mechanisms comprise:

a first hydraulic pump assembly connected to and powering a first hydraulic motor, and the first hydraulic motor is engaged to and drives a first wheel of the pair of driven wheels; and a second hydraulic pump assembly connected to and powering a second hydraulic motor, and the second hydraulic motor is engaged to and drives a second wheel of the pair of driven wheels.

13. The vehicle of claim 12, wherein a second circulating pump assembly of the plurality of circulating pump assemblies is mounted on a first pump housing of the first hydraulic pump assembly.

14. The vehicle of claim 13, further comprising a hydraulic reservoir in fluid communication with at least the first hydraulic pump assembly and the first hydraulic motor, the hydraulic reservoir having a heat exchanger, and the second circulating pump assembly is in communication with the heat exchanger to provide coolant fluid thereto.

15. The vehicle of claim 13, further comprising an auxiliary pump mounted on and forming a part of the second hydraulic pump assembly.

16. The vehicle of claim 9, wherein the pair of power transfer mechanisms comprise:

a first hydraulic pump assembly connected to and powering a first hydraulic motor, and the first hydraulic motor is engaged to and drives a first wheel of the pair of driven wheels; and a second hydraulic pump assembly connected to and powering a second hydraulic motor, and the second hydraulic motor is engaged to and drives a second wheel of the pair of driven wheels.

17. The vehicle of claim 16, further comprising a receiver disposed on the vehicle for receiving signals from a remote operator transmitter, thereby permitting remote operation of the vehicle.

18. The vehicle of claim 17, further comprising an operator platform disposed at one end of the vehicle and adjacent the pair of driven wheels, permitting direct user control of the vehicle.

* * * * *